US006757285B1

(12) United States Patent
Lakhani et al.

(10) Patent No.: US 6,757,285 B1
(45) Date of Patent: Jun. 29, 2004

(54) METHOD AND APPARATUS FOR COMPLETING TELEPHONE CALLS BETWEEN SUBNETWORKS

(75) Inventors: Faizel Lakhani, Kanata (CA); Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/213,769

(22) Filed: Dec. 17, 1998

(51) Int. Cl.[7] .............................................. H04L 12/56
(52) U.S. Cl. ..................... 370/395.2; 370/230; 370/352
(58) Field of Search ................................. 370/352, 385, 370/395.5, 395.51, 410, 395.2, 230

(56) References Cited

U.S. PATENT DOCUMENTS

| | | | |
|---|---|---|---|
| 5,463,621 A | | 10/1995 | Suzuki ......................... 370/60 |
| 5,483,527 A | * | 1/1996 | Doshi et al. ................ 370/60.1 |
| 5,528,592 A | | 6/1996 | Schibler et al. ............ 370/60.1 |
| 5,568,475 A | | 10/1996 | Doshi et al. ................ 370/58.2 |
| 5,719,863 A | | 2/1998 | Hummel ...................... 370/392 |
| 5,867,571 A | * | 2/1999 | Borchering .................. 379/230 |
| 5,940,491 A | * | 8/1999 | Anderson et al. ........... 379/230 |
| 5,956,334 A | * | 9/1999 | Chu et al. ................. 370/395.2 |
| 6,141,342 A | * | 10/2000 | Cheesman et al. .......... 370/352 |
| 6,154,445 A | * | 11/2000 | Farris et al. ................. 370/237 |
| 6,169,735 B1 | * | 1/2001 | Allen, Jr. et al. ........... 370/352 |
| 6,195,714 B1 | * | 2/2001 | Li et al. ......................... 710/31 |
| 6,275,493 B1 | * | 8/2001 | Morris et al. ................ 370/395 |
| 6,282,194 B1 | * | 8/2001 | Cheesman et al. .......... 370/356 |
| 6,430,195 B1 | * | 8/2002 | Christie et al. .............. 370/465 |

FOREIGN PATENT DOCUMENTS

| | | | |
|---|---|---|---|
| EP | 0 793 393 | 2/1997 | ............ H04Q/3/00 |
| WO | WO 98/23056 | 11/1997 | ............. H04J/3/16 |
| WO | WO 98/35527 | 1/1998 | ........... H04Q/11/04 |

OTHER PUBLICATIONS

Abdi R. Modarressi, et al. "Signaling System No. 7: A Tutorial", 2460 IEEE Communications Magazine, 28(1990) Jul., No. 7, New York, US pp. 19–34.
Network Working Group Internet Draft Document, Demizu et al, Oct. 1997.

* cited by examiner

*Primary Examiner*—Dang Ton
*Assistant Examiner*—Tri H. Phan
(74) *Attorney, Agent, or Firm*—Withrow & Terranova, PLLC

(57) ABSTRACT

A method and apparatus for completing telephone calls between trunk subnetworks overlaid on an ATM backbone is described. Each of the trunk subnetworks include a call manager which is configured for exchanging signaling messages with both a common channel signaling network and the ATM backbone network. This permits ATM facility providers to link subnetworks using a common infrastructure so that calls can be effectively diverted from the PSTN between end offices while fully supporting PSTN/ISDN services. This is achieved by using a signaling method in which call request messages are encoded by a first call manager with a parameter so that a second call manager in the signaling path can effect backward call set up between ATM interfaces using data from the parameter. The advantage is the extension of call completion between subnetworks overlaid on an ATM backbone using ATM facilities without sacrificing PSTN/ISDN call features.

19 Claims, 7 Drawing Sheets

APPLICATION TRANSPORT PARAMETER (ISUP)

| | 8 | 7 | 6 | 5 | 4 | 3 | 2 | 1 | |
|---|---|---|---|---|---|---|---|---|---|
| 1 | EXT | APPLICATION CONTEXT IDENTIFIER | | | | | | | |
| 2 | EXT | SPARE | | | | | AT | | |
| 3 | EXT | SI | APM SEGMENTATION INDICATOR | | | | B | A | |
| 3A | EXT | SLR | | | | | | | |
| 4A ····· 4N | ENCAPSULATED APPLICATION INFORMATION | | | | | | | | |

FIG. 3

METHOD AND APPARATUS FOR COMPLETING TELEPHONE CALLS BETWEEN SUBNETWORKS

TECHNICAL FIELD

The present invention relates to the field of providing telephone services using asynchronous transfer mode (ATM) facilities and, in particular, to a method and apparatus for completing telephone calls between ATM subnetworks overlaid on an ATM backbone network.

BACKGROUND OF THE INVENTION

Telecommunication service providers are considering using ATM as the technology of choice to consolidate their networking infrastructure under one "umbrella". An aim of this activity is to provide ATM switching systems in a networking backbone that can serve as the transport technology for traffic emanating from different sources. A second aim of this activity is to allow service providers to maximize their investment in ATM equipment. Service providers to date have primarily used ATM networks for data transport. By using ATM networks as a backbone for diverse traffic sources, service providers can expand the usage of their ATM facilities and maximize the return on capital investment made in this equipment.

In addition, the development of systems for supporting telephone services on an ATM backbone is being driven by increasing congestion arising in the PSTN/ISDN. The increasing demand for long distance services, resulting from price reductions and competition among carriers and the demand for access to Internet Service Providers (ISPs) is contributing to greater demand on available capacity in the PSTN/ISDN.

However, several challenges exist in deploying telephone service on an ATM network backbone. One of the challenges facing this network evolution involves the challenge of providing the multitude of services available in today's PSTN/ISDN. The services provided by ATM based telephone service must remain the same as the services provided in the PSTN/ISDN. However, today's ATM switches and networks are not enabled to support PSTN/ISDN services. ATM switches currently deployed lack both the physical infrastructure and signaling systems to support PSTN/ISDN intelligent services. Beyond simple connection control, they do not provide any of the intelligent services such as free-phone, number translation, local number portability and the myriad of supplementary services provided by a PSTN/ISDN switch. An additional consideration is the fact that regulatory requirements in some jurisdictions dictate the types of service that a service provider must offer. In addition, customers cannot be expected to accept fewer services when a service provider changes or upgrades transport facilities. A reduction in the number of services results in an immediate loss of customers, loss of revenue, and difficulties in marketing to new customers due to competition.

An ATM based system which is capable of supporting the services offered in the PSTN/ISDN is described in Applicant's co-pending patent application entitled TRANSIT TRUNK SUBNETWORK which was filed on Sept. 23, 1998 and has been assigned U.S. patent application Ser. No. 09/158,855, the disclosure of which is incorporated herein by reference. A transit trunk subnetwork permits an ATM subnetwork to be integrated into the PSTN using interfaces referred to as "Multi-Service Platforms" (MSPs). The MSPs provide access to the ATM subnetwork by synchronous transfer mode (STM) switches and convert pulse code modulated (PCM) data to ATM cells and vice versa. The Transit Trunk Subnetwork also includes a call manager which communicates with STM switches through a Common channel Signaling (CCS) network, such as the Signaling System 7 (SS7) network. The call manager also communicates with the ATM subnetwork through ATM links. Consequently, the call manager is enabled to support PSTN/ISDN intelligent services, while permitting the ATM subnetwork to serve as the transport medium for bearer traffic routed between STM switches in the subnetwork.

However, in order to capitalize on the benefits offered by the Transit Trunk Subnetwork, a need exists for a method of completing calls between subnetworks without diverting the calls through the PSTN.

SUMMARY OF THE INVENTION

Accordingly, it is an object of the present invention to provide a method for completing calls between transit trunk subnetworks without diverting the calls into the PSTN.

It is a further object of the invention to provide a signaling protocol to permit call routing between transit trunk subnetworks.

It is a further object of the invention to provide a signaling protocol for completing calls between transit trunk subnetworks which uses the CCS system of the PSTN/ISDN.

It is yet a further object of the invention to provide a signaling protocol for completing calls between transit trunk subnetworks which uses backward call set up in which calls are set up by routing signaling messages from a terminating interface to an originating interface, even though CCS messages proceed in a standard forward direction.

It is another object of the invention to provide a signaling protocol for completing calls between transit trunk subnetworks in which standard Integrated Services Digital Network User Part (ISUP), SS7 signaling messages are used to complete calls so that call control signaling is effected without modifying PSTN/ISDN switches served by the subnetworks.

In accordance with the above objects, the invention provides an apparatus for transferring voice or voice grade data using ATM protocol between first and second telephone switches, respectively associated with first and second subnetworks. The first and second subnetworks are adapted to be used in the ATM backbone networks for the transfer of inter-switch bearer traffic. The first telephone switch has a first interface with the first subnetwork and the second telephone switch has a second interface with the second subnetwork. The first and second interfaces are adapted to convert PCM data to ATM cells and vice versa. The apparatus comprises a first call manager logically associated with the first subnetwork and a second call manager logically associated with the second subnetwork. The first call manager is enabled to exchange signaling messages with the second call manager containing information to effect call set up between the first and second interfaces.

In accordance with the above objects, the invention also provides a method for telephone call routing between first and second telephone switches respectively associated with first and second subnetworks using ATM protocol to transfer bearer traffic between the telephone switches. The first telephone switch has a first interface with the first subnetwork and the second telephone switch has a second interface with the second subnetwork. A first call manager is logically associated with the first subnetwork, while a second call manager is logically associated with the second subnetwork. The method comprises the steps of first routing a call request message from the first telephone switch to the first call manager. The first call manager receives the call request message and translates a dialed number extracted from the call request message to obtain routing information for the call. The first call manager also modifies the call request message to include information pertaining to the origination of the call and then forwards the modified call request message to the second call manager using the routing information. When the modified call request message is received at the second call manager, the dialed number is translated from the message to identify the second telephone switch. The second call manager uses an ATM message to advise the second interface of the modified call request message and then sends the second interface an ATM message to provide call origination and termination details. The second interface sends an ATM message to the first interface to initiate a virtual connection for transferring bearer traffic associated with the call. Thereafter, the second call manager further modifies the call request message and then forwards this further modified message to the second telephone switch to initiate seizure of a trunk to carry the call.

BRIEF DESCRIPTION OF THE DRAWINGS

FIG. 3 is a schematic diagram illustrating the structure of an Application Transport Parameter (APP) which is encoded into certain ISUP signaling messages;

DETAILED DESCRIPTION OF THE PREFERRED EMBODIMENT

The present invention relates to an apparatus and method for supporting call transfer between transit trunk subnetworks overlaid on an ATM backbone network which provides both narrowband and broadband services.

Figure 1:
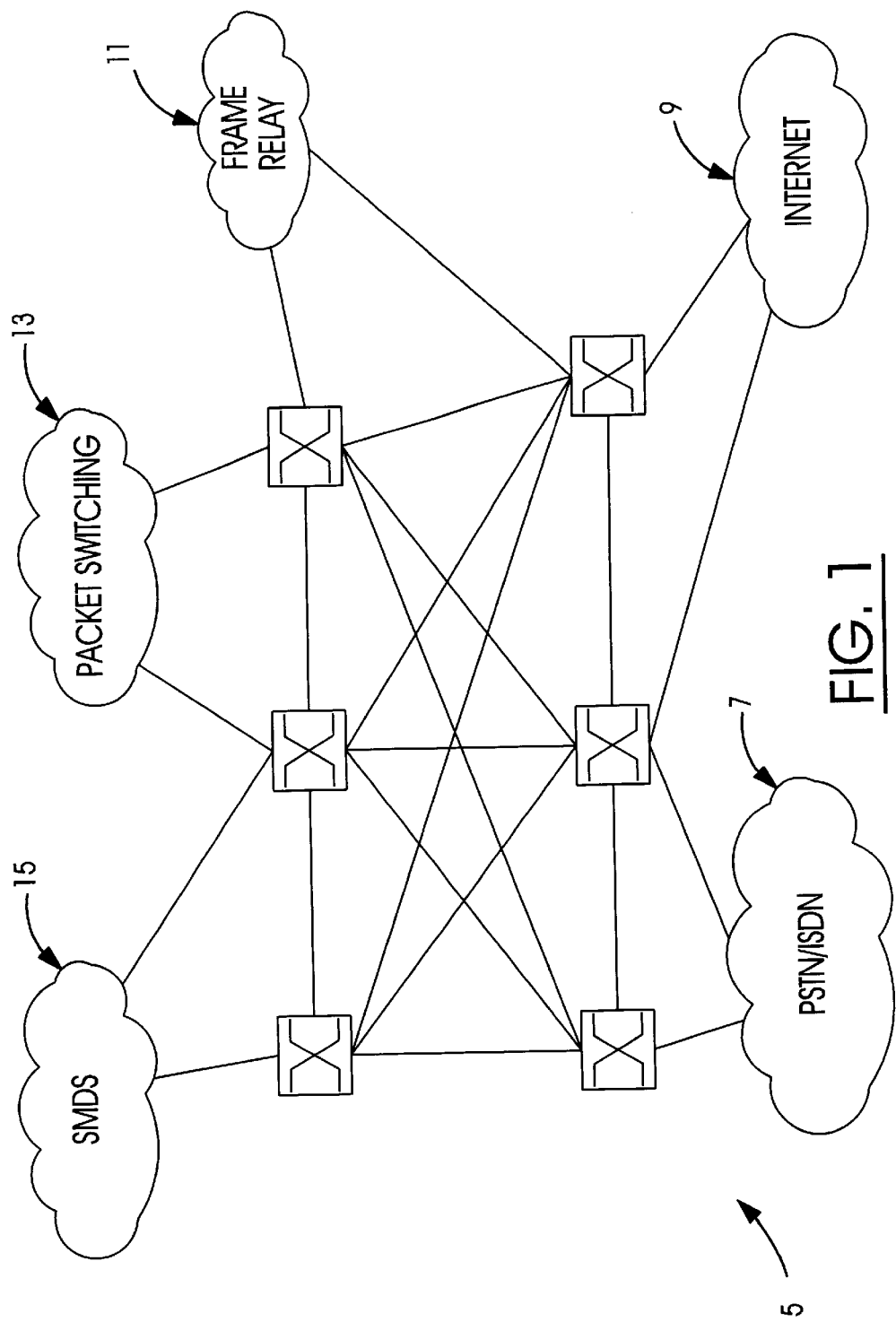
FIG. 1 is a schematic diagram illustrating an ATM backbone network which supports the transfer of traffic emanating from different sources.

FIG. 1 is a schematic diagram illustrating an ATM backbone network 5 which supports traffic emanating from different sources. The sources of traffic are illustrated as network islands consisting of: a PSTN/ISDN 7; an Internet network 9; a frame relay network 11; a packet switching network 13; and a switched multi-mega bit data service (SMDS) 15. The ATM backbone network 5 includes a plurality of ATM switches which are interconnected by ATM links, schematically illustrated by solid lines between the switches. FIG. 1 shows six such switches, although an ATM backbone network may include any number of ATM switches, and the physical size of the network is a matter of design choice. The ATM backbone network 5 may be used to support a plurality of logical subnetworks for supporting PSTN/ISDN services. Such subnetworks may be the transit trunk subnetworks referred to above and described in Applicant's co-pending patent application.

Figure 2:
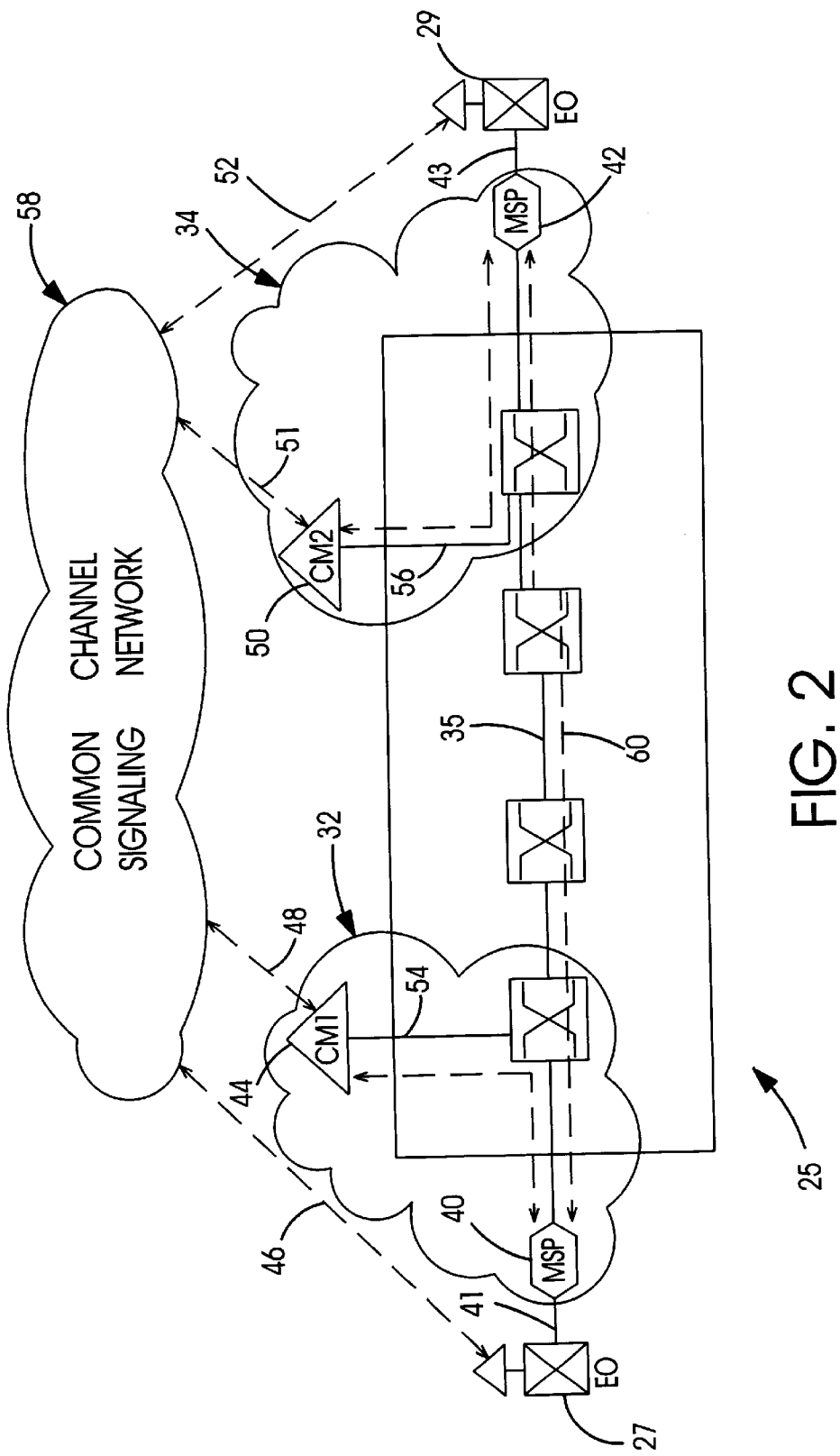
FIG. 2 is a schematic diagram illustrating a network topology and signaling configuration for a PSTN supported by ATM subnetworks overlaid on an ATM backbone.

FIG. 2 schematically illustrates a network architecture which permits bearer traffic to be routed between two end offices 27 and 29 in the PSTN through an ATM backbone network 25. The end offices 27 and 29 are respectively served by different transit trunk subnetworks. The ATM backbone network is represented by block 25 and is of indeterminate size. The ATM backbone network 25 supports at least a first transit trunk subnetwork 32 and a second transit trunk subnetwork 34, hereinafter referred to as subnetworks 32, 34. Each of the subnetworks 32 and 34 are associated with ATM switches that are interconnected by ATM links. The first subnetwork 32 and second subnetwork 34 are schematically shown as being interconnected by a link 35, representative of one or more virtual circuits (VCs) that may be established to interconnect the subnetworks 32 and 34. Since the ATM backbone network 25 provides only a transport service, it can be abstracted and considered as a single hop between two interfaces which may be considered to be adjacent in the path of the call. This concept leads to the term "ATM trunking", which denotes the use of switched Virtual Channel Connections (VCCs) or switched virtual path connections (VPCs) to carry traffic from one interface at a PSTN/ISDN node to another rather than the usual trunks based on the current PSTN/ISDN hierarchy. Establishment of these ATM "trunks" is done under the control of both ISUP and ATM protocols, as will be further explained below.

The interfaces between the end offices 27, 29 and the ATM backbone 25 are hereinafter referred to as Multi-Service Platforms (MSPs) 40 and 42, which are described in further detail in applicant's co-pending application described above. The MSPs 40 and 42 convert PCM data to ATM cells and vice versa. In addition, the MSPs 40 and 42 map VCCs, in particular, SVCs set up for transferring bearer traffic between the corresponding trunks 41 and 43 seized at the respective end offices 27 and 29.

The network architecture of FIG. 2 also includes a first call manager 44 associated with the subnetwork 32 and a second call manager 50 associated with the subnetwork 34. Each of the first and second call managers 44 and 50 have a CCS network point code, and are configured to receive and route ISUP signaling messages through the CCS network, as will be further explained below. Although the MSPs 40, 42 and the call managers 44, 50 are illustrated in FIG. 2 as separate entities, it should be understood that they may be implemented on the same platform. The call managers may also be implemented within the end offices 27, 29 as explained in Applicant's co-pending United States patent application entitled HYBRID TDM AND ATM VOICE SWITCHING CENTRAL OFFICE AND METHOD OF COMPLETING INTER-OFFICE CALLS USING SAME which was filed on Dec. 7, 1998.

The network architecture of FIG. 2 further includes CCS signaling links 46 and 52 which permit the end offices 27 and 29 to communicate with the CCS network 58, which typically uses SS7 protocol. The first call manager 44 includes a CCS signaling link 48, while the second call manager 50 includes a CCS signaling link 51. Each of the call managers further include ATM links 54 and 56 to permit the first and second call managers to send control messages to the MSPs 40 and 42. CCS messages from both the end offices and call managers are thus routed over the CCS network 58, while control messages for MSPs in the subnetworks 32, 34 are routed through the ATM backbone network 25 using ATM circuits. The ATM circuits are schematically illustrated by the dashed lines between the first MSP 40 and first call manager 44, and between second MSP 42 and second call manager 50. The ATM bearer circuit 60 that results when a call is set up is also illustrated schematically between the subnetworks 32 and 34. Thus, each call manager is configured to engage in ISUP signaling with the CCS network, and control messaging with the subnetworks, but maintains these signaling functions separate from each other. This configuration permits the network architecture to support intelligent services derived from the PSTN/ISDN, while using an ATM backbone as the underlying infrastructure for call transport. In addition, the signaling configuration imposes minimum requirements on the ATM backbone network 25, making the architecture immediately feasible for implementation in the PSTN/ISDN. Furthermore, no changes to the CCS protocol is needed, since CCS messaging and ATM control messages are managed separately by each call manager.

However, in order to implement the necessary signaling protocols required to set up calls between two or more subnetworks, some mechanism must be implemented to enable the call managers associated with each of the subnetworks to obtain information pertaining to the call. In accordance with the invention, the mechanism used is a messaging parameter used to transfer the information. This parameter is referred to as an Application Transport parameter (APP) which is inserted into ISUP signaling messages routed across the CCS network 58 (FIG. 2). The APP consists of a plurality of octets which provide various information for signal processing across ATM subnetworks. The APP is defined in further detail in Report R-77 of the Telecommunications Standardization Sector of the International Telecommunication Union, published November 1997, which is incorporated herein by reference.

FIG. 3 provides a schematic diagram of the structure of an APP. Each of the first four octets include a one bit extension indicator, which is used to indicate whether further octets exist. This permits expansion of the value range for each field. If the extension indicator is set to "0", a further octet exists. If it is set to "1", no further octet exists. The first extension indicator is followed by a seven bit application context identifier which is a value that uniquely identifies the application using the application transport mechanism. The second octet includes the one bit extension identifier followed by five spare bits. The following two bits are Application Transport Instruction Indicators (ATII), respectively referred to as "B" and "A". Bit B is a Send Notification Indicator which either provides an instruction to send or not send a notification. Bit A is a Release Call Indicator which will either indicate an instruction to release or not to release a call. Octet 3 has the one bit extension indicator followed by a one bit Sequence Indicator (SI). The SI is used to indicate the first segment of an Application Transport Message (APM) Segmentation Indicator sequence. The APM is a message type described in Report R-77 referred to above and incorporated herein by reference. The APM is an ISUP message type which is used for call completion when a VCC is deployed from cache. The use of the APM in call set-up is described in further detail below with reference to FIG. 6. The APM Segmentation Indicator indicates the number of remaining segments carrying information used in the APM. The APM Segmentation Indicator indicates a final segment (value="0"), or a specified number of segments are to follow (value="1–9"). Octet 3a has the one bit extension indicator, followed by a Segmentation Local Reference (SLR) defined in seven bits. The SLR is a unique value assigned to a call and is used to associate segments in a segmented APM. The number of segments are defined by the APM Segmentation Indicator in Octet 3. Octets 4a through 4n contain Encapsulated Application Information and utilize eight bits in a variable number of octets. The Encapsulated Application Information is application information required to be transported by an ISUP Initial Address Message (IAM) or an APM. The coding for the Encapsulated Application Information may take several forms. For example, the coding may be a tag followed by a length field and a value field; a tag followed by a value field only; or a tag followed by flags.

For the purposes of call set-up between subnetworks, the Encapsulated Application Information defines three sets of data required during call set-up. These are:

(1) An ATM VCC identifier;
(2) The ATM address of the MSP associated with the originating end office; and
(3) A signalling correlation tag;

The purpose of these three sets of data carried in the Encapsulated Application Information field is explained with reference to the call set-up signaling sequence set forth in FIG. 4A.

Figure 4A:
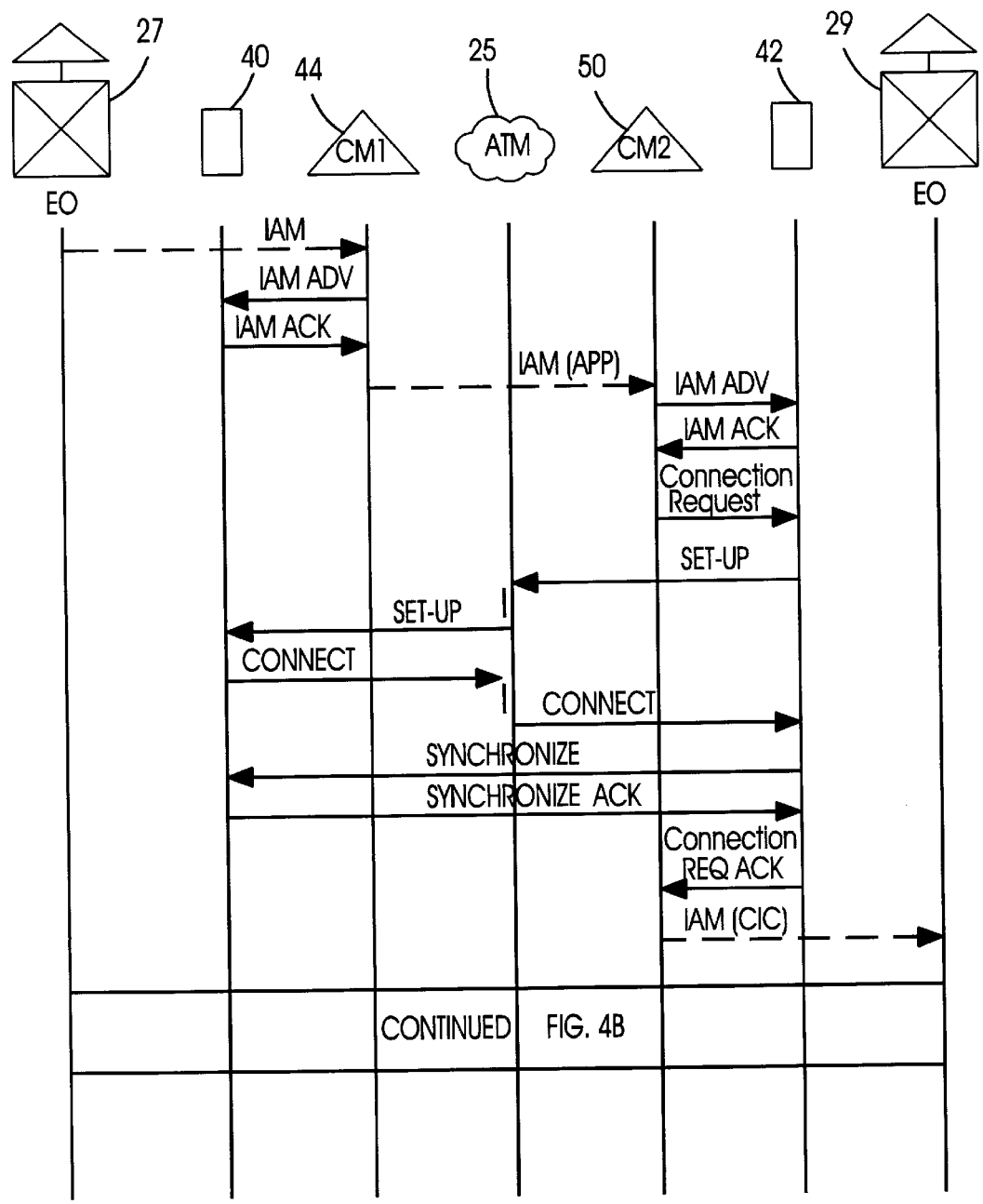
FIG. 4A illustrates a signaling sequence for establishing calls across subnetworks overlaid on an ATM backbone, where the bearer traffic of the calls are routed across switched virtual circuits (SVCs) set up for the call.

FIG. 4A illustrates a signalling sequence for setting up calls through the ATM backbone network 25 shown in FIG. 2. FIG. 4A illustrates the signalling sequence for connection set-up using VCCs when a call originates at an end office 27 and terminates at an end office 29. It should be understood, however, that analogous principles may be applied when a call is set up across any number of intermediate subnetworks. The interface between the originating end office 27 and the first subnetwork is provided by a first MSP 40 and a first call manager 44. The interface between the terminating end office 29 and the second subnetwork is provided by a second MSP 42 and a second call manager 50. In the signaling sequences illustrated in FIGS. 4a–6, dashed lines are used to indicate ISUP signal messages while solid lines are used to indicate ATM signal messages.

As shown in FIG. 4A, a call originates at end office 27. In response to the call, the originating end office 27 formulates an SS7 IAM and forwards the IAM over the SS7 network to the first call manager 44 associated with the first subnetwork. On receipt of the IAM, the first call manager 44 extracts call information from the message and formulates an IAM Advisory message (IAM ADV) which it sends through the ATM backbone network 25 to the first MSP 40. The MSP 40 responds with an IAM Acknowledge (IAM ACK) which is returned to the first call manager 44. The first call manager 44 translates a dialed number extracted from the IAM to obtain routing information for the call. The IAM is then modified to include: an originating point code (OPC) of the call manager 44; a destination point code (DPC) of the call manager 42 in the second subnetwork 34; and information to identify features of the first subnetwork 32 related to the call. The modified IAM is subsequently sent to the second call manager 50. The IAM is modified in part by inserting the APP shown in FIG. 3, which includes the Application Context Identifier and the three pieces of data stored in the Encapsulated Application Information Fields, as described previously. These are:

(1) An ATM VCC identifier;
(2) The ATM address of the first MSP; and
(3) A signaling correlation tag.

The ATM VCC identifier is used in conjunction with the Application Context Identifier as set forth in FIG. 3. The Application Context Identifier shown in FIG. 3 provides an indication to the second call manager 50 that an ATM VCC is to be used between the second MSP 42 and first MSP 40 for the transfer of call data but it does not identify a specific ATM VCC to be used for the call. The second MSP 42 will either set up a new ATM VCC with the first MSP 40 or select an existing VCC from cache. The ATM address of the first MSP 40 identifies where the first MSP 40 is located in the ATM backbone network 25. This information is required by the second MSP 42 to establish a VCC to the first MSP 40. The inclusion of the ATM address of the first MSP 40 enables the setup in a backwards direction of the VCC between the two MSPs. The Signaling Correlation Tag enables the first MSP 40 to correlate a Set-Up message sent in the backwards direction from the second MSP 42 to the first MSP 40 with the IAM ADV from the first call manager 44 to the first MSP 40. This allows the SVC to be mapped to the TDM trunk at the originating end office seized for the call.

Once the IAM has been modified to include the APP, it is routed to the second call manager 50. On receipt of the modified IAM, the second call manager 50 sends an IAM ADV to the second MSP 42. The second MSP 42 returns an IAM ACK to the second call manager 50. On receipt of the IAM ACK, the second call manager 50 sends a Connection Request message to the second MSP 42. The Connection Request message includes the data from the Encapsulated Application Information field of the APP. On receipt of the Connection Request message, the second MSP 42 examines the Encapsulated Application Information to determine whether an existing (cached) VCC exists with the first MSP 40, or a new VCC must be established for the call.

In the present example, it is assumed that a new VCC is established for the call. The second MSP 42 formulates a Set-Up message which contains an ATM VCC Identifier selected by the MSP 42 to identify the VCC to be used for the call and the Signaling Correlation Tag from the APP. The Set-Up message is routed through the ATM backbone network 25 in a manner well known in the art to a terminating node which serves the first MSP 40. The Set-Up message sets up the ATM VCC as a switched virtual circuit (SVC) between the second MSP 42 and the first MSP 40, and is identified to the first MSP 40 by the VCC Identifier. The Signaling Correlation Tag in the Set-Up message is then used by the first MSP 40 to correlate the Setup message to the IAM ADV message previously sent from the first call manager 44 to the first MSP 40. This correlation permits the first MSP 40 to map the SVC set up between the MSPs 42 and 40 to a TDM trunk member seized by the originating office 27 for carrying the call. The setup of the SVC is then completed by a Connect message sent from the first MSP 40 to the second MSP 42 along the same path traversed by the Set-Up message, but in the forward direction. This is followed by a Synchronize message sent from the second MSP 42 to the first MSP 40. The Synchronize message tests the integrity of the SVC set up for the call. The first MSP 40 responds with a Synchronize Acknowledge message (Synchronize ACK) message sent from the first MSP 40 to the second MSP 42. Upon receipt of the Synchronize ACK message, the MSP 42 sends a Connection Request Acknowledgement (Connection REQ ACK) to the second call manager 50. Concurrently, the second call manager 50 removes the APP data from the IAM and amends the IAM to include a circuit identification code (CIC) of a trunk maintained in a trunk group that connects the end office 29 to the second MSP 42. The CIC indicates to the end office 29 the trunk on which the incoming call will arrive. The IAM, as amended, is then sent from the second call manager 50 to the terminating end office 29.

Figure 4B:
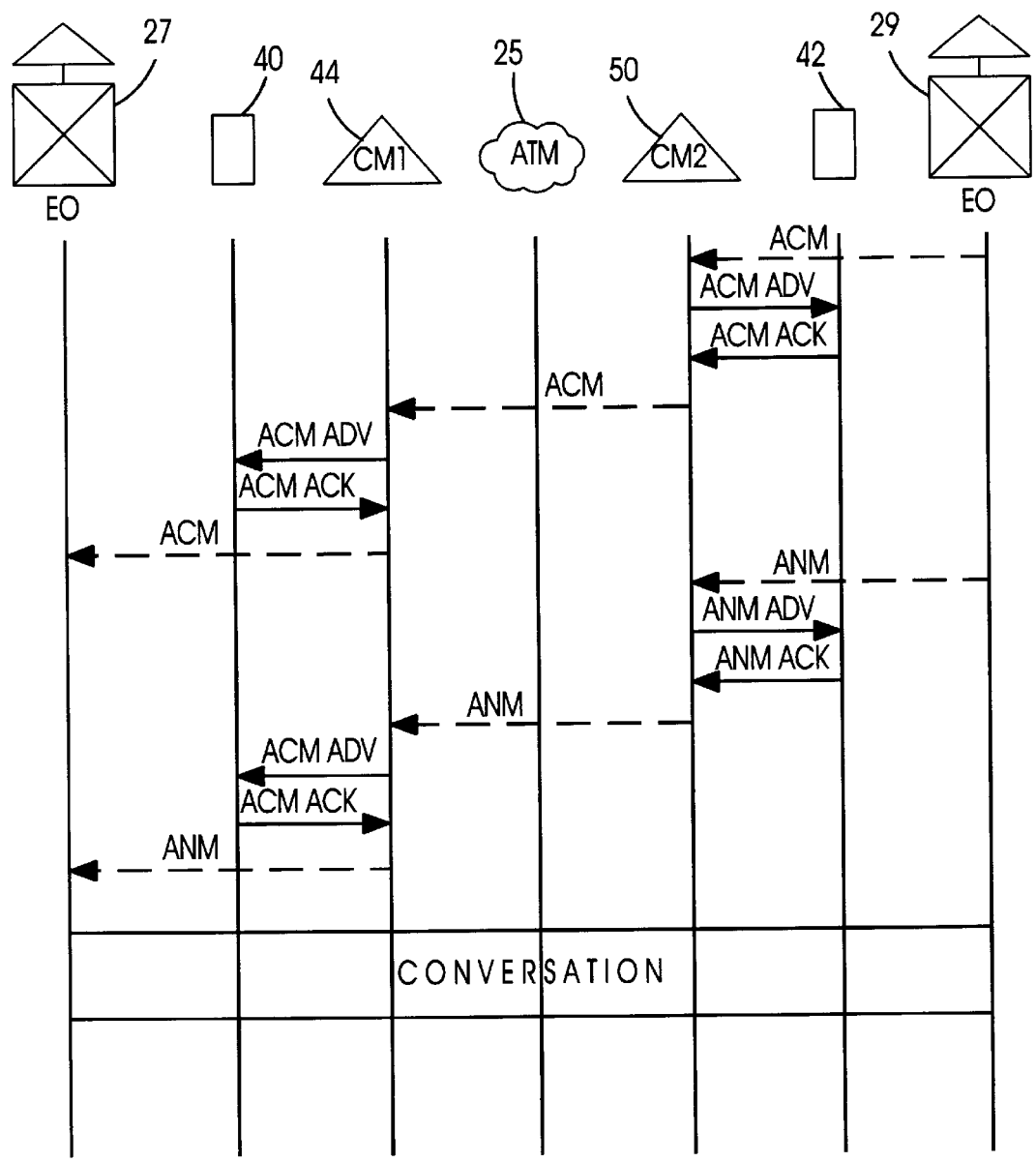
FIG. 4B illustrates the remaining steps in the signaling sequence of FIG. 4A.

FIG. 4B illustrates a signaling sequence which is a continuation of the signaling sequence set forth in FIG. 4A. On receipt of the IAM at the terminating end office 29, the terminating end office verifies that the number is valid and the called line is available. After the verifications are complete, the terminating end office formulates an Address Complete message (ACM) and sends the ACM to the second call manager 50. The second call manager 50 then sends an ACM Advisory message (ACM ADV) to the second MSP 42, which responds with an ACM Acknowledge message (ACM ACK). Upon receipt of the ACM ACK, the ACM is forwarded from the second call manager 50 to the first call manager 44, which likewise sends an ACM ADV to the first MSP 40, which returns an ACM ACK. Upon receipt of the ACM ACK, the first call manager 44 forwards the ACM to the originating end office 27. Receipt of the ACM at the originating end office 27 completes a connection between the calling party line and the called party line. Consequently, ringing applied to the called party line by the terminating end office 29 is heard by the calling party. When the called party answers, an Answer message (ANM) is sent from the terminating end office 29 to the second call manager 50. The second call manager 50 responds by sending an ANM Advisory message (ANM ADV) to the second MSP 42, which returns an ANM Acknowledge message (ANM ACK). Upon receipt of the ANM ACK, the second call manager 50 forwards the ANM to the first call manager 44. The first call manager 44 sends an ANM ADV to the first MSP 40 which returns an ANM ACK. The ANM is then sent from the first call manager 44 to the originating end office 27 and conversation proceeds as for any regular call with the pulse code modulated (PCM) call data being transferred through the ATM backbone network 25.

Figure 5:
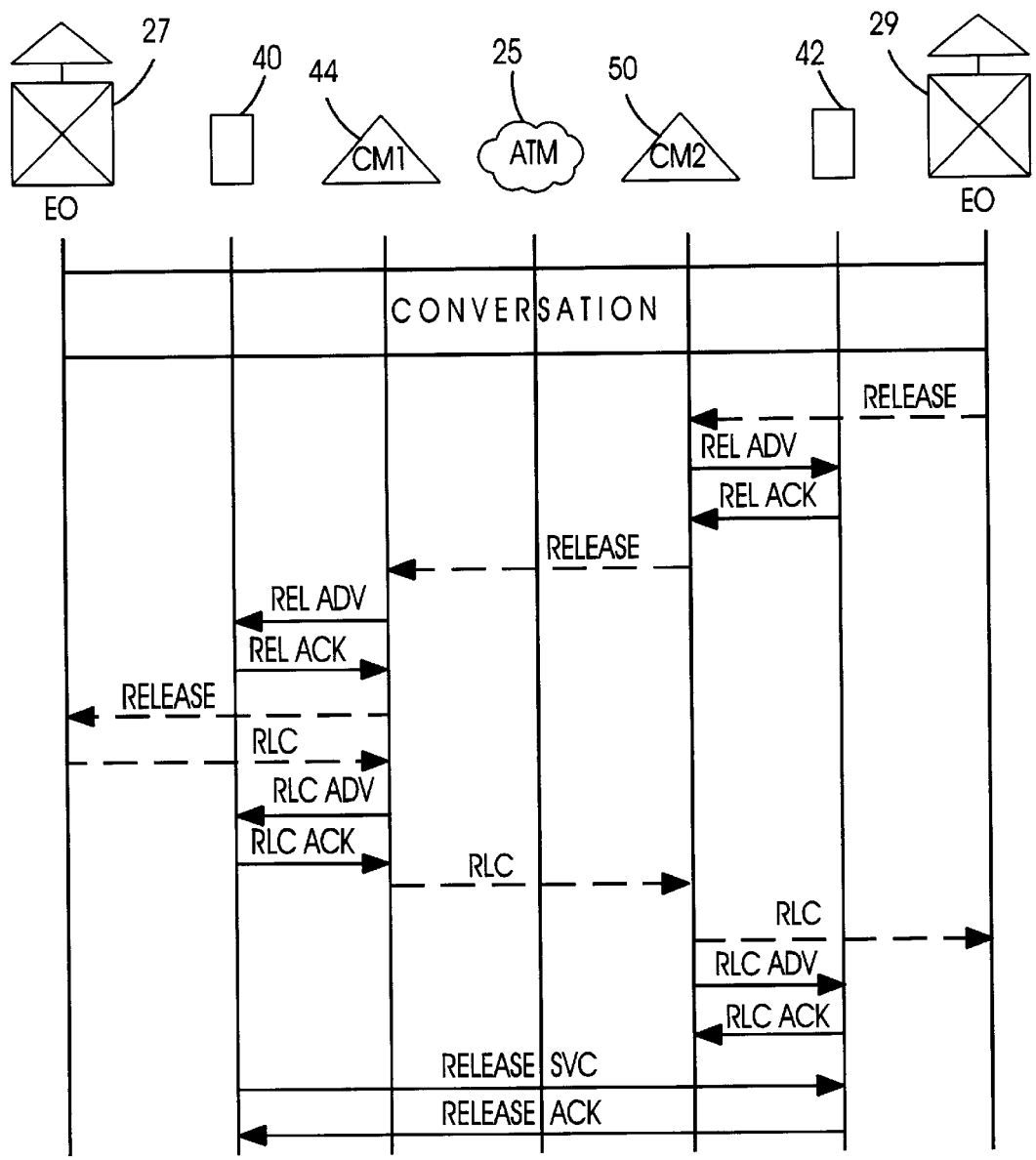
FIG. 5 illustrates a signaling sequence for taking down calls across subnetworks overlaid on an ATM backbone, where bearer traffic of the calls is transferred using SVCs set up for the calls.

FIG. 5 illustrates a signaling sequence for taking down calls set-up between originating end office 27 and terminating end office 29, where the bearer traffic of the call is transferred by the ATM backbone network 25. The network elements shown in FIG. 5 are identical to the network elements illustrated in FIGS. 4a and 4B.

When the party at the end office 29 goes on-hook, a Release message is sent from end office 29 to the second call manager 50 which responds by sending a Release Advisory Message (REL ADV) to the second MSP 42, which returns a Release Acknowledge message (REL ACK) Upon receipt of the REL ACK, the second call manager 50 forwards the REL message to the first call manager 44, which sends a REL ADV to the first MSP 40, which returns a REL ACK. The REL message is then forwarded to the originating end office 27. The originating end office 27 responds with a Release Complete message (RLC) to the first call manager 44. The first call manager 44 responds to receipt of the RLC message by sending an RLC Advisory message (RLC ADV) to the first MSP 40 which returns an RLC Acknowledge message (RLC ACK). The RLC is subsequently sent to the second call manager 50, which forwards the RLC to the terminating end office 29. The second call manager 50 also sends an RLC ADV message to the second MSP 42 which responds with an RLC ACK. The SVC which was established for the call is released when the first MSP 40 sends a Release SVC message to the second MSP 42 in response to the RLC Advisory message received from the first call manager 40. This is acknowledged by a Release Acknowledge (Release ACK) message sent from the second MSP 42 to the first MSP 40. At this point, the call is completely taken down and the SVC established for the call is released, freeing the ATM facilities for use by other traffic.

Figure 6:
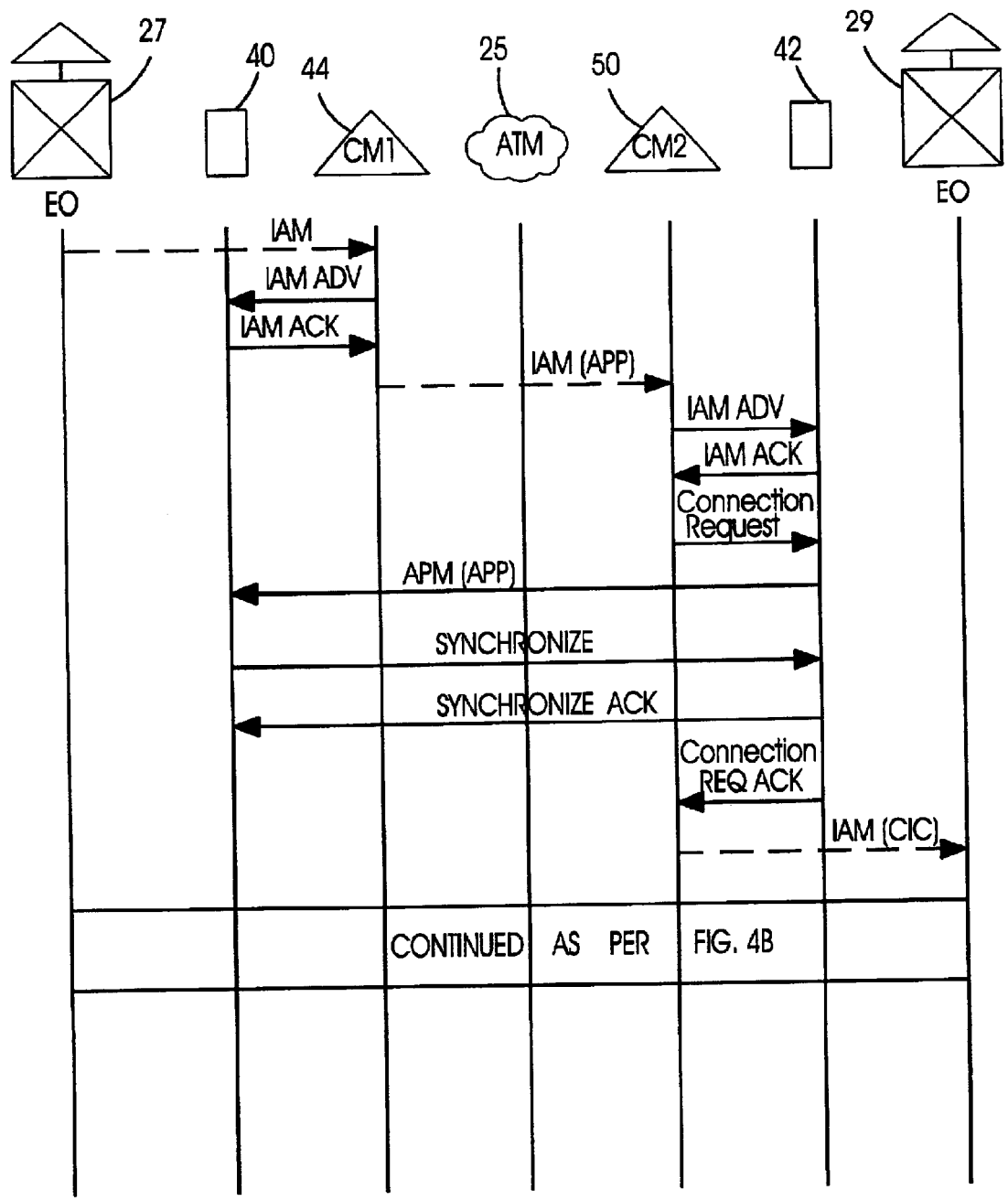
FIG. 6 illustrates a signaling sequence for establishing calls across subnetworks overlaid on an ATM backbone, where the bearer traffic of the calls is transferred using SVCs removed from an SVC cache.

FIG. 6 illustrates a signaling sequence where a call is established through the ATM backbone network 25 and the VCCs used to transfer the bearer traffic are SVCs that were pre-established and stored in a cache. This signaling sequence utilizes an APM signaling message which is defined in Report R-77 of the International Telecommunications Union described above, and which is incorporated herein by reference. The APM is an ISUP signaling message sent in either direction to convey application information. The APP described previously is encoded into the APM in substantially the same manner that it is encoded into an IAM message except that it includes a VCC identifier. The APM enables backward call set up between two subnetworks overlaid on the ATM backbone network 25 when a pre-established VCC is selected from cache for carrying bearer traffic associated with a call. Although the APM is an ISUP protocol message, the data in the APM may be packed into an ATM cell(s) and sent through the ATM backbone 25. The signaling sequence illustrates the steps for call setup when the call originates at end office 27 and terminates at end office 29. The network configuration is identical to the one described above with reference to FIGS. 4A and 4B.

As shown in FIG. 6, a call originates at end office 27, which formulates and sends an IAM to the first call manager 44 in response to digits dialed by a calling party. On receipt of the IAM, the first call manager 44 extracts call information, formulates an IAM ADV and sends it to the first MSP 40, which returns an IAM ACK. The first call manager 44 then modifies the IAM to include: an OPC of the first call manager 44; a DPC of the second call manager 50; and information to identify features of the first subnetwork related to the call. This information is defined in part by the Encapsulated Application Information Fields of the APP, as described above. Once the APP has been encoded into the IAM, the IAM is sent from the first call manager 44 to the second call manager 50. Upon receipt of the IAM, the second call manager 50 sends an IAM ADV to the second MSP 42 which responds with an IAM ACK. Upon receipt of the IAM ACK, the second call manager 50 formulates and sends a Connection Request message to the second MSP 42. The Connection Request message includes the Encapsulated Application Information extracted from the IAM.

On receipt of the Connection Request message, the second MSP 42 examines the Encapsulated Application Information to determine whether a pre-established (cached) VCC exists for the ATM address of the first MSP 40. In the present example, it is assumed that an idle cached VCC exists and that it is selected for the call. SVC caching is described in detail in Applicant's co-pending United States patent application entitled METHOD AND APPARATUS FOR REDUCTION OF CALL SETUP RATE IN ATM NETWORK which was filed on Oct. 2, 1998, the entire specification of which is incorporated herein by reference. The second MSP 42 formulates an APM message containing an APP which is encoded with two pieces of data in the Encapsulated Application Information Field. The first is the ATM VCC Identifier, which identifies an available SVC in the cache pool to carry the bearer traffic associated with the call. The second is the Signaling Correlation Tag which will correlate the APM to an IAM ADV previously sent from the first call manager 44 to the first MSP 40.

The ATM VCC Identifier permits the first MSP 40 to select the available SVC to carry the bearer traffic for the call. The Signal Correlation Tag permits the first MSP 40 to also correlate the APM message to the IAM ADV previously sent from the originating end office 27 to the first MSP 40. This correlation permits the SVC selected from cache to be mapped to the TDM trunk seized at the originating end office. The first MSP 40 then sends a Synchronize message to the second MSP 42. The Synchronize message tests the integrity of the SVC connection, and is followed by a Synchronize ACK returned by the second MSP 42. Subsequently, the second MSP 42 sends a Connection REQ ACK to the second call manager 50. When the second call manager 50 receives the Connection REQ ACK message, it inserts CIC information into the IAM to identify a TDM trunk member in a trunk group that connects the second MSP 42 to the terminating end office 29. The IAM with the CIC information is then sent from the second call manager 50 to the terminating end office 29. Subsequently, call processing proceeds in a manner identical to that described above with reference to FIG. 4B.

Call release procedures for calls set up using SVCs from cache follow substantially the same signaling sequence as illustrated in FIG. 5. After the ISUP signaling sequence is complete, or concurrently with it, a decision must be made as to whether the SVC used for the call is to be returned to the cache or released. If the SVC is to be returned to cache, a one of the two MSPs, the first MSP 40, for example, which serves as master of the cache pool sends a Cache SVC message (not shown) to the second MSP 42 and changes the status of the SVC in the cache to "idle". Otherwise, a Release SVC message is sent from the first MSP 40 to the second MSP 42, which instructs the second MSP to release the SVC. The Release SVC message is acknowledge by a Release ACK to complete the SVC release.

It should be understood that although the PSTN signaling described above assumes a use of ISUP protocol, other signaling protocols which are enabled to control call flow through a switched telephone network could also be used. It should also be understood that although the CCS network is described as the preferred path for signaling messages exchanged between the PSTN telephone switches and the call managers 44, 50, the ATM backbone network 25 could also be used to transfer signaling messages. To accomplish this, the PSTN telephone switches are provided with ATM interfaces in a manner well known in the art.

There has thus been shown and described novel aspects of a method and apparatus for setting up calls between ATM subnetworks, which fulfil the objects and advantages described herein. Changes, modifications, variations, combinations, sub-combinations and other uses and applications of the subject invention may, however, become apparent to those skilled in the art after considering the specification and the accompanying drawings which disclose the preferred embodiments thereof. All such changes, modifications, variations and other uses and application which do not depart from the spirit and scope of the invention are deemed to be covered by the invention, which is to be limited only by the scope of the appended claims.

What is claimed is:

1. An apparatus for transferring voice or voice grade data between first and second telephone switches respectively associated with first and second subnetworks adapted to use a backbone network for the transfer of inter-switch bearer traffic, said first telephone switch having a first interface with said first subnetwork and said second telephone switch having a second interface with said second subnetwork, said first and second interfaces being respectively adapted to convert pulse code modulated data to a data format of the backbone network and vice versa, the apparatus comprising:

a first call manager logically associated with the first subnetwork;

a second call manager logically associated with the second subnetwork;

said first call manager is adapted to exchange signaling messages with said second call manager through the Signaling System 7 (SS7) network, at least one of the signaling messages comprising an Initial Address Message (IAM) containing information for signal processing across the backbone network to enable call set up between said first and second interfaces, said first call manager is further adapted to receive an IAM from said first switch and modify a content of said IAM to include the information, which is related to said first interface and is required to set up a call associated with the IAM; and said second call manager is adapted to further modify the IAM to include indicia indicating a trunk on which said call will arrive and forward the further modified IAM to said second telephone switch to initiate seizure of said trunk for said call.

2. The apparatus as claimed in claim 1, wherein said second interface is configured to effect backward call set up by routing messages through the backbone network from said second interface to the said first interface to enable connections to be effected between said first and second interfaces.

3. A method for routing a telephone call between a first and second telephone switch respectively associated with a first and second subnetwork which transfer bearer traffic between telephone switches in the respective subnetworks using a protocol of a backbone network, said first telephone switch having a first interface with said first subnetwork and said second telephone switch having a second interface with said second subnetwork, first and second call managers being logically associated with said respective first and second subnetworks, comprising the steps of:

(i) routing a call request message from said first switch to said first call manager;

(ii) translating a dialed number extracted from said call request message to obtain routing information for said call;

(iii) modifying said call request message to include information for signal processing across the backbone network and forwarding said modified call request message to said second call manager using the routing information for the call request message;

(iv) translating a dialed number extracted from said modified call request message at said second call manager to identify said second telephone switch;

(v) sending a signaling message from said second call manager to said second interface, the signaling message including the information for signal processing across the backbone network;

(vi) sending a signaling message from said second interface to said first interface to effect a connection to transfer bearer traffic associated with the call; and (vii) further modifying the call request message to include indicia indicating a trunk on which the call will arrive and forwarding said further modified call request message from said second call manager to said second telephone switch to initiate seizure of said trunk at said second switch to enable call completion.

4. The method as claimed in claim 3, wherein said call request messages are common channel signaling messages.

5. The method as claimed in claim 3, wherein said call request messages are SS7 Initial Address Messages (IAM).

6. The method as claimed in claim 3, wherein the step of modifying said call request message comprises:

inserting network address of said first interface into the call request message.

7. The method as claimed in claim 3, wherein the step of modifying said call request message further comprises:

inserting a correlation tag to permit correlation at the first interface between a message related to said modified call request message with said signaling message sent from the second interface to the first interface.

8. The method as claimed in claim 3, wherein said signaling message sent from the second interface to the first interface enables connections to be effected between said first and second subnetworks for transferring bearer traffic associated with the call through the backbone network.

9. The method as claimed in claim 3, wherein said signaling message sent from the second interface to the first interface identifies an existing connection through the backbone network for transferring the bearer traffic.

10. The method as claimed in claim 3, wherein said call request message is an ISUP signaling message.

11. The apparatus as claimed in claim 1, wherein the call set up is effected in a backwards direction with respect to a call path, the call set up being effected from the second interface to the first interface.

12. The apparatus as claimed in claim 1, wherein said SS7 signaling messages comprise ISDN User Part (ISUP) messages.

13. The apparatus as claimed in claim 1, wherein the backbone network is an ATM backbone network.

14. The apparatus as claimed in claim 13, wherein said first and second interfaces being respectively adapted to convert pulse code modulated data to ATM cells and vice versa.

15. The apparatus as claimed in claim 13, wherein said second interface is configured to effect backward call set up by routing messages through the ATM backbone network from said second interface to the said first interface to enable virtual channel connections to be effected between said first and second interfaces.

16. The method as claimed in claim 3, wherein the backbone network is an ATM backbone network.

17. The method as claimed in claim 16, wherein said signaling messages are ATM signaling messages.

18. The method as claimed in claim 16, wherein said signaling message sent from the second interface to the first interface enables virtual channel connections to be effected between said first and second subnetworks for transferring bearer traffic associated with the call through the ATM backbone network.

19. The method as claimed in claim 16, wherein said signaling message sent from the second interface to the first interface identifies an existing virtual channel connection through the ATM backbone network for transferring the bearer traffic.

* * * * *